United States Patent [19]

Prince

[11] Patent Number: 4,871,915

[45] Date of Patent: Oct. 3, 1989

[54] DETECTOR FOR BREMSSTRAHLUNG-ISOCHROMATIC-SPECTROSCOPY (BIS)

[75] Inventor: Kevin C. Prince, Jülich, Fed. Rep. of Germany

[73] Assignee: Kernforschungsanlage Julich GmbH, Julich, Fed. Rep. of Germany

[21] Appl. No.: 277,549

[22] Filed: Nov. 29, 1988

[30] Foreign Application Priority Data

Dec. 9, 1987 [DE] Fed. Rep. of Germany ....... 3741675

[51] Int. Cl.[4] ....................... G01N 23/22; G01N 21/62

[52] U.S. Cl. ................................ 250/372; 250/458.1; 250/459.1

[58] Field of Search .................. 250/372, 458.1, 459.1, 250/306

[56] References Cited

U.S. PATENT DOCUMENTS

| | | | |
|---|---|---|---|
| 3,174,036 | 3/1965 | Alexeff | 250/306 |
| 4,393,311 | 7/1983 | Feldman et al. | 250/459.1 |
| 4,472,634 | 9/1984 | Baptist et al. | 250/372 |

*Primary Examiner*—Carolyn E. Fields

*Attorney, Agent, or Firm*—Herbert Dubno

[57] ABSTRACT

A detector for bremsstrahlung-isochromatic-spectroscopy (BIS) utilizing a gas-filled metal cylinder forming an outer electrode and a wire extending axially in the cylinder has an inner electrode. The window for the UV photons is constituted of $MgF_2$ while the counting gas is a mixture of dimethylether and an inert gas and in which the pressure of the dimethylether is 0.2 to 0.5 mbar.

8 Claims, 3 Drawing Sheets

DETECTOR FOR BREMSSTRAHLUNG-ISOCHROMATIC-SPECTROSCOPY (BIS)

FIELD OF THE INVENTION

My present invention relates to a detector for bremsstrahlung-isochromatic-spectroscopy (BIS) or ultraviolet (UV) inverse photoemission spectroscopy, and more particularly, to a detector of this type which comprises a metal cylinder forming one electrode of a detector, namely, the outer electrode, an axially extending wire forming an inner electrode lying along the axis, a window for the UV photons to be transmitted to and detected at the metal cylinder, and a gas filling the metal cylinder.

BACKGROUND OF THE INVENTION

In bremsstrahlung-isochromatic-spectroscopy (BIS), which is also referred to as inverse photoemission spectroscopy, one can determine the unoccupied band structure of solid bodies and their surfaces.

The surface is irradiated with electrons and the emitted ultraviolet photons are detected. Energy selection is effected by forming the ultraviolet transparent window as a low-pass element and selecting the detector gas as a high-pass element. The combination of the two thus constitutes a band filter.

Conventional detectors comprise the following combinations of window material and gas fillings. With them, photons of the indicated energy can be detected.

| Window | Gas | Photon Energy (eV) |
|---|---|---|
| $CaF_2$ | $I_2$ + Inert | 9.7 ± 0.35 |
| $SrF_2$ | $I_2$ + Inert | 9.28 − 9.43 |
| $CaF_2$ | $CS_2$ | 10.08 |
| $CaF_2$ | $(CH_3)_2CO$ | 9.9 |

As will be noted from the foregoing, the gas filling of the conventional detectors is often constituted from a vapor of a liquid or solid (iodine). This is disadvantageous because the vapor pressures of such material is not only temperature dependent, because of the fact that the substances derive from materials which may be liquid or solid at room temperature, a stabilization of the temperature is required to maintain constant partial pressure of the counter gases and thus a reproducible detection sensitivity.

The detectors which utilize iodine as a counter gas have the further drawback that iodine is very corrosive. The useful life of pumps, valves and other components of the vacuum apparatus is thereby reduced. With those detectors or counters in which $CS_2$ is used, special precautions have to be taken because the carbon disulfide is highly poisonous. The detector may have to be used in a hood or the like.

OBJECTS OF THE INVENTION

It is, therefore, the principal object of the present invention to provide a detector or counter tube for BIS or inverse photoemission spectroscopy which will be free from the drawbacks enumerated above.

It is an object of this invention to provide an improved method of bremsstrahlung-isochromatic-spectroscopy whereby drawbacks associated with the earlier counter tubes or detectors are no longer present.

SUMMARY OF THE INVENTION

These objects and others which will become apparent hereinafter are attained, in accordance with the present invention by providing a window of the detector or counter tube so that it is constituted of magnesium fluoride ($MgF_2$) while the counter gas, i.e. the gas filling the tube or detector, consists of a mixture of dimethylether $(CH_3)_2O$ and an inert gas, e.g. argon or some other conventional counter inert gas or inert gas mixture as used in a BIS detector.

Advantageously, the partial pressure of the dimethylether in the detector is 0.2 to 0.5 mbar while the partial pressure of the inert gas is about 150 mbar.

The resolution of the detector according to the invention is ±0.3 eV.

Dimethylether, at room temperature, is a gas and its use has been found to make the detector practically insensitive to temperature fluctuations. The gas does not condense or adsorb on the walls and the partial pressure remains constant even at increased temperatures.

The detector according to the invention has greater stability and therefore is simpler to service than conventional detectors known in the art for BIS.

Dimethylether, moreover, is never corrosive nor highly poisonous. The detector of the invention is thus both safer and simpler to use.

An important advantage of the detector according to the invention is that it can detect energies of 10.6 eV, namely energies which are higher than those constituting the response range of earlier detectors. Utilizing the detector according to the invention, therefore, the spectral range which is detected can be broadened.

BRIEF DESCRIPTION OF THE DRAWING

The above and other objects, features and advantages of the present invention will become more readily apparent from the following description, reference being made to the accompanying drawing in which.

SPECIFIC DESCRIPTION AND EXAMPLE

Figure 1:
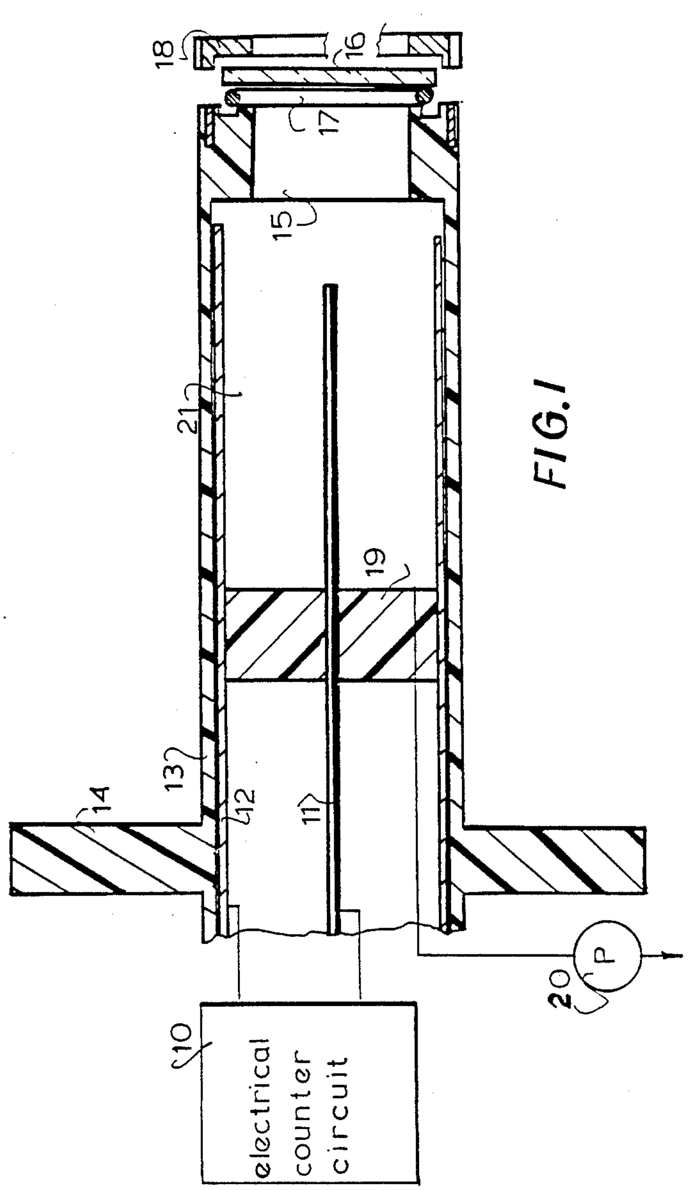
FIG. 1 is a cross sectional view of a BIS detector according to the invention.

In FIG. 1 are shown the basic elements of a BIS detector or counting tube according to the invention.

The counter circuit is shown at 10 to be connected to an inner electrode 11 and an outer electrode 12. The outer electrode 12 is a cylindrical metal shell which is received in a cylindrical housing 13 provided with a vacuum connection flange 14 and open at its end 15. A $MgF_2$ window 16 is fastened across the mouth of the tube against an O-ring seal 17 by a clamping ring 18 shown only diagrammatically. The housing 13 and the electrode 12 are composed of stainless steel.

The wire electrode 11 which extends along the axis of the detector and is supported in a polytetrafluoroethylene spacer 19, can be composed of tungsten.

The thickness of the $MgF_2$ circular-disk-shaped window 16 can be about 2 mm and any dimensional tolerances can be absorbed by compression of the O-ring 17.

The diameter of the cylindrical detector can be about 30 mm and the diameter of the inner electrode 11 is 1.5 mm.

Via the flange 14, the detector can be connected to a vacuum pump which has been shown diagrammatically only at 20 and should be capable of pumping the pressure in the apparatus down to $10^{-4}$ mbar before the counting chamber 21 is sealed. Dimethylether is added to the chamber to a pressure of 0.4 mbar as measured with a Pirani manometer and has inert gas, argon, which is admitted to a pressure of 150 mbar. The operating voltage amounts to 560 volts and the pulses which are generated for counting have a height of 0.3 volt.

Figure 2:
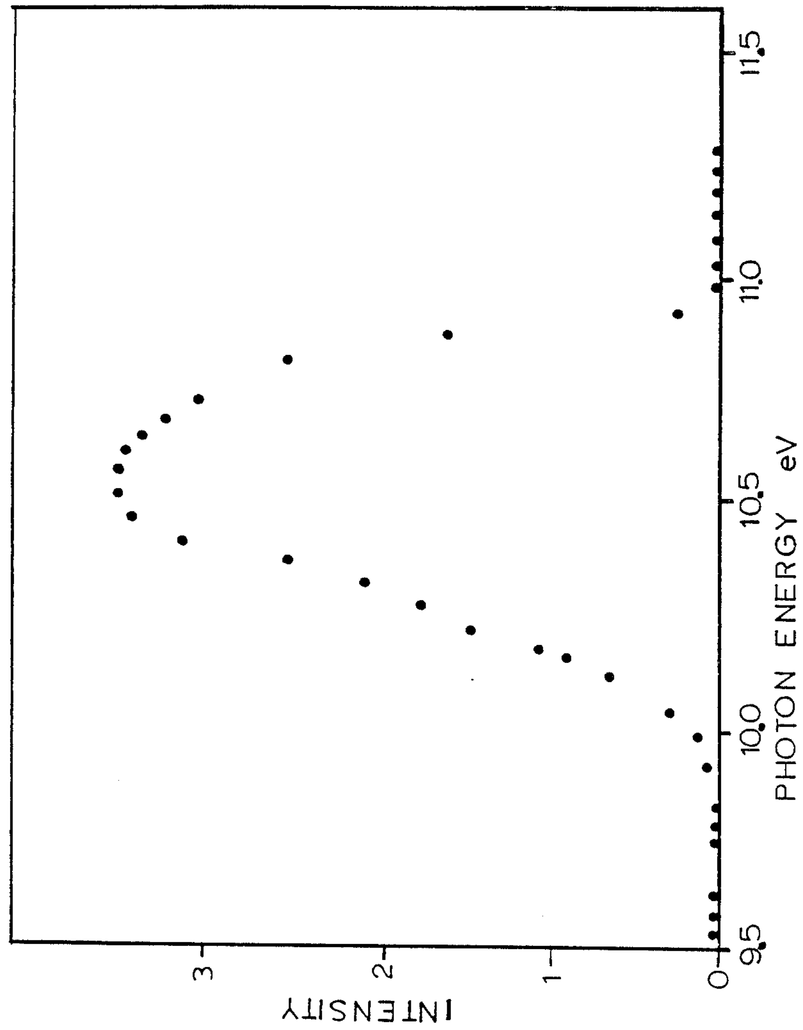
FIG. 2 is a graph of the transmission function of the detector of FIG. 1 in which photon energy has been plotted along the abscissa in eV versus intensity plotted along the ordinate.

FIG. 2 shows the transmission function of the detector measured with ultraviolet light. On the ordinate, the number of pulses per incident photon is plotted while the photon energy is emitted along the abscissa.

Figure 3:
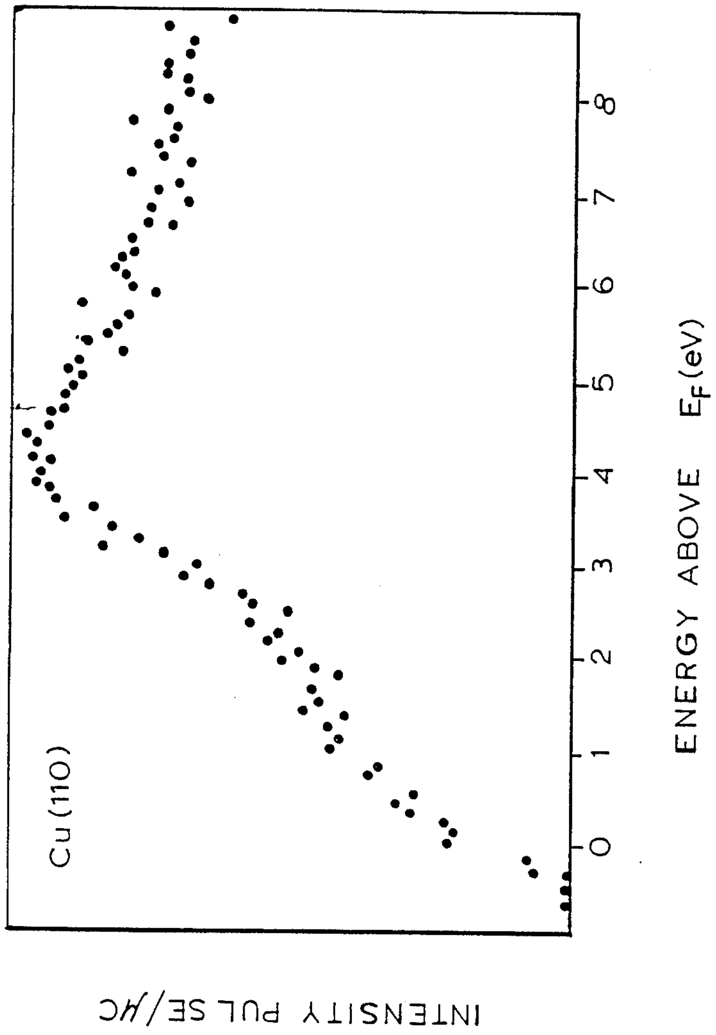
FIG. 3 is a BIS spectrum of a Cu (110) crystal utilizing the detector and in which energy above the threshold energy $E_F$ is plotted in electron volts along the abscissa versus pulse intensity along the ordinate.

FIG. 3 shows the BIS spectrum of a monocrystal of copper (110) as detected with the detector described. The ordinate plots the intensity of the pulse per microcoulomb and on the abscissa, the energy above the Fermi energy is plotted. The incident angle of the electron beam upon the crystal is 45°.

I claim:

1. A detector for bremsstrahlung-isochromatic-spectroscopy (BIS) which comprises:
   - a hollow metal cylinder forming an outer electrode of said detector;
   - a wire extending axially through said cylinder and forming an inner electrode of said detector;
   - means forming an $MgF_2$ window in said metal cylinder traversed by ultraviolet photons to be detected; and
   - a gas mixture in said cylinder consisting of dimethylether $CH_3$—O—$CH_3$ and an inert gas.

2. The detector for BIS defined in claim 1 wherein said dimethylether has a partial pressure in said cylinder of substantially 0.2 to 0.5 mbar.

3. The detector for BIS defined in claim 2 wherein said inert gas has a partial pressure in said cylinder of about 150 mbar.

4. The detector for BIS defined in claim 1 wherein said inert gas has a partial pressure in said cylinder of about 150 mbar.

5. A method of detecting a band structure of a solid, comprising the steps of:
   (a) training electrons onto a solid having a lattice structure capable of emitting ultraviolet photons;
   (b) detecting the emitted ultraviolet photons by passing said photons through an $MgF_2$ window in a metal cylinder forming an outer electrode of a detector for bremsstrahlung-isochromatic-spectroscopy (BIS) which comprises a wire extending axially through said cylinder and forming an inner electrode of said detector; and
   (c) maintaining in said cylinder a gas mixture consisting of dimethylether $CH_3$—O—$CH_3$ and an inert gas.

6. The method defined in claim 5 wherein said dimethylether has a partial pressure in said cylinder of substantially 0.2 to 0.5 mbar.

7. The method defined in claim 6 wherein said inert gas has a partial pressure in said cylinder of about 150 mbar.

8. The method defined in claim 5 wherein said inert gas has a partial pressure in said cylinder of about 150 mbar.

* * * * *